United States Patent [19]

Dymond

[11] Patent Number: 5,494,127
[45] Date of Patent: * Feb. 27, 1996

[54] POWER STEERING SYSTEM

[75] Inventor: Richard W. Dymond, Rochester Hills, Mich.

[73] Assignee: TRW Inc., Lyndhurst, Ohio

[*] Notice: The portion of the term of this patent subsequent to Mar. 15, 2011, has been disclaimed.

[21] Appl. No.: 168,514

[22] Filed: Dec. 16, 1993

Related U.S. Application Data

[63] Continuation-in-part of Ser. No. 947,347, Sep. 18, 1992, Pat. No. 5,293,954.

[51] Int. Cl.[6] .............................. B62D 5/083; F15B 9/08
[52] U.S. Cl. ............................ 180/141; 180/143; 91/371
[58] Field of Search ..................................... 180/141, 143, 180/149, 132, 142; 91/371, 375 A

[56] References Cited

U.S. PATENT DOCUMENTS

| | | | |
|---|---|---|---|
| 4,811,806 | 3/1989 | Lang | 180/141 |
| 4,819,545 | 4/1989 | Dymond | 180/143 |
| 5,046,574 | 9/1991 | Goodrich et al. | 180/143 |
| 5,070,958 | 12/1991 | Goodrich et al. | 180/143 |
| 5,291,963 | 3/1994 | Sangret | 180/141 |
| 5,348,110 | 9/1994 | Klein et al. | 180/141 |
| 5,392,875 | 2/1995 | Duffy | 180/141 |

*Primary Examiner*—Margaret A. Focarino
*Assistant Examiner*—Carla Mattix
*Attorney, Agent, or Firm*—Tarolli, Sundheim & Covell

[57] ABSTRACT

A power steering control valve including relatively rotatable inner and outer valve members. A power steering resistance control system resists relative rotation between the inner and outer valve members with a force which varies as a function of variations in vehicle speed and steering demand. The power steering resistance control system includes a force transmitting member which is disposed adjacent to one end of an outer valve member. A spring force is applied against the force transmitting member urging it in a first direction along the axis of rotation of the valve member. Fluid pressure is applied against the force transmitting member to urge it in the first direction. In a first embodiment, a speed responsive valve is operable to vary the fluid pressure applied against the force transmitting member as a function of variations in vehicle speed. A hydraulic pressure responsive valve is operable to vary the fluid pressure applied against the force transmitting member as a function of steering demand. In a second embodiment, only a hydraulic pressure responsive valve controls the pressure applied against the force transmitting member.

28 Claims, 5 Drawing Sheets

POWER STEERING SYSTEM

This is a continuation-in-part of application Ser. No. 07/947,347 filed on Sep. 18, 1992 now U.S. Pat. No. 5,293,954.

BACKGROUND OF THE INVENTION

The present invention relates to a vehicle power steering system, and more specifically to a hydraulic vehicle power steering system in which the resistance to actuation of a power steering control valve increases with increasing steering demand.

A known rotary power steering control valve shown in U.S. Pat. No. 5,046,574 has an inner valve member which is coaxial with and rotatable relative to an outer valve member or sleeve. To effect actuation of the power steering motor to turn steerable vehicle wheels, the inner valve member is rotated relative to the outer valve member. A fluid pressure reaction chamber is provided to regulate the torque required to rotate the inner valve member relative to the outer valve member. The fluid pressure in the reaction chamber increases as vehicle speed increases to increase the resistance felt by an operator of the vehicle to rotation of the inner valve member relative to the outer valve member.

SUMMARY OF THE INVENTION

The present invention provides a new and improved apparatus for controlling the operation of a hydraulic power steering motor of a vehicle. The apparatus includes a manually actuated hydraulic, rotary, directional control valve having inner and outer relatively rotatable valve members. The relative rotation of the valve members provides flow and pressure control of the hydraulic fluid from the pump to the steering motor and its return to reservoir.

In a first embodiment of the present invention, a speed responsive control unit is connected in fluid communication with the control valve by a conduit through which hydraulic fluid from the control valve is returned to a reservoir. The speed responsive control unit is programmed to increasingly restrict fluid flow to the reservoir when there is a steering input and as vehicle speed increases to increase the pressure in a fluid pressure chamber that regulates the torque required to displace the inner valve member relative to the outer valve member.

As the pressure in the fluid pressure chamber increases, the resistance to relative rotation between the inner and outer valve members is increased and to the vehicle operator the steering feels more manual while still having power assisted steering. The speed responsive control unit includes means for increasing the resistance to relative rotation in response to steering activity. In neutral, the control valve is in an open center condition and hydraulic fluid is circulated at low pressure from the pump to the reservoir. Thus, the power steering pump does not have to act against high pressure when there is no steering and energy can be saved.

A force transmitting member rotatable with the inner valve member is pressed toward the outer valve member by a biasing spring with a small spring constant and the fluid pressure in the fluid pressure chamber. The force transmitting member provides resistance to relative rotation between the inner and outer valve members that increases as pressure in the fluid pressure chamber increases. The speed responsive control unit includes a speed responsive valve that varies the pressure in the fluid pressure chamber as a function of vehicle speed. A hydraulic pressure responsive valve connected in parallel with the speed responsive valve increases the pressure in the fluid pressure chamber when there is steering. The hydraulic pressure responsive valve is maintained open to vent the fluid pressure chamber to reservoir pressure when there is no steering demand, and moves toward a closed position in response to increasing hydraulic fluid pressure due to a steering demand. Thus, the pump does not have to pump against an increasing pressure in the fluid pressure chamber as vehicle speed increases when there is no steering demand.

In a second embodiment of the present invention, only a hydraulic pressure responsive valve varies the pressure in the fluid pressure chamber as a function of the steering demand. The hydraulic pressure responsive valve increases the pressure in the fluid pressure chamber when the inner and outer valve members move relative to each other. The more the inner and outer valve members move relative to each other the more the hydraulic pressure responsive valve increases the pressure in the fluid pressure chambers.

BRIEF DESCRIPTION OF THE DRAWING

The foregoing and other features of the present invention will become apparent to one skilled in the art upon reading the following description with reference to the accompanying drawings wherein.

DESCRIPTION OF THE PREFERRED EMBODIMENT

Figure 1A:
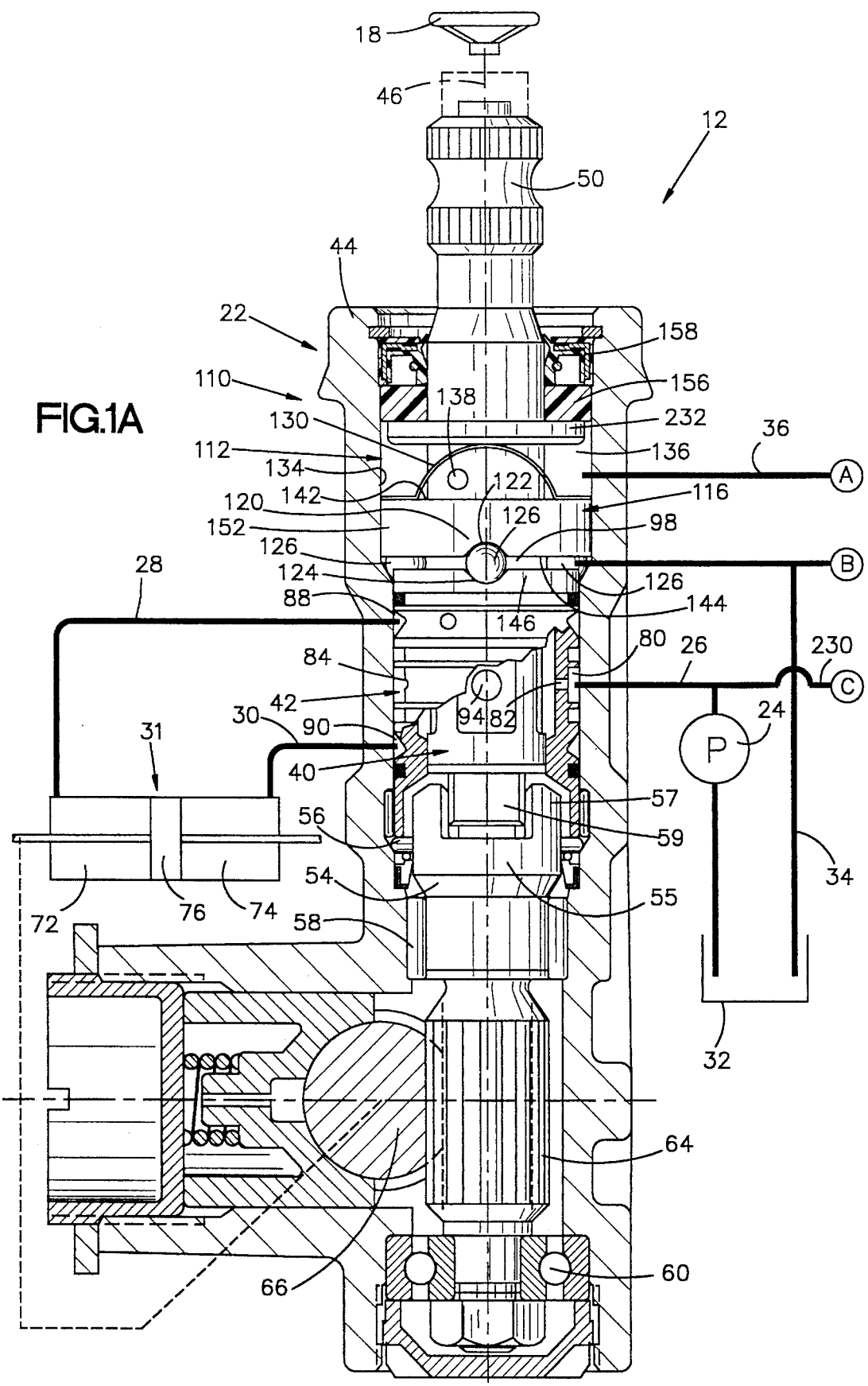
FIG. 1A is a schematic view of a portion of a first embodiment of a vehicle power steering system and includes an enlarged sectional view of a power steering control valve.

In a first embodiment of the present invention, a vehicle power steering system 12 (FIG. 1A) is operable to turn steerable vehicle wheels (not shown) upon rotation of a steering wheel 18 by an operator of the vehicle. Rotation of the steering wheel 18 actuates a hydraulic power steering directional control valve 22 to port hydraulic fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in one or another direction. Simultaneously, fluid is conducted from the motor 31 to a reservoir 32 through the other one of the motor conduits 28 or 30, the control valve 22, return conduits 34 and 36, and a speed responsive control unit 38 (FIG. 1B).

Figure 1B:
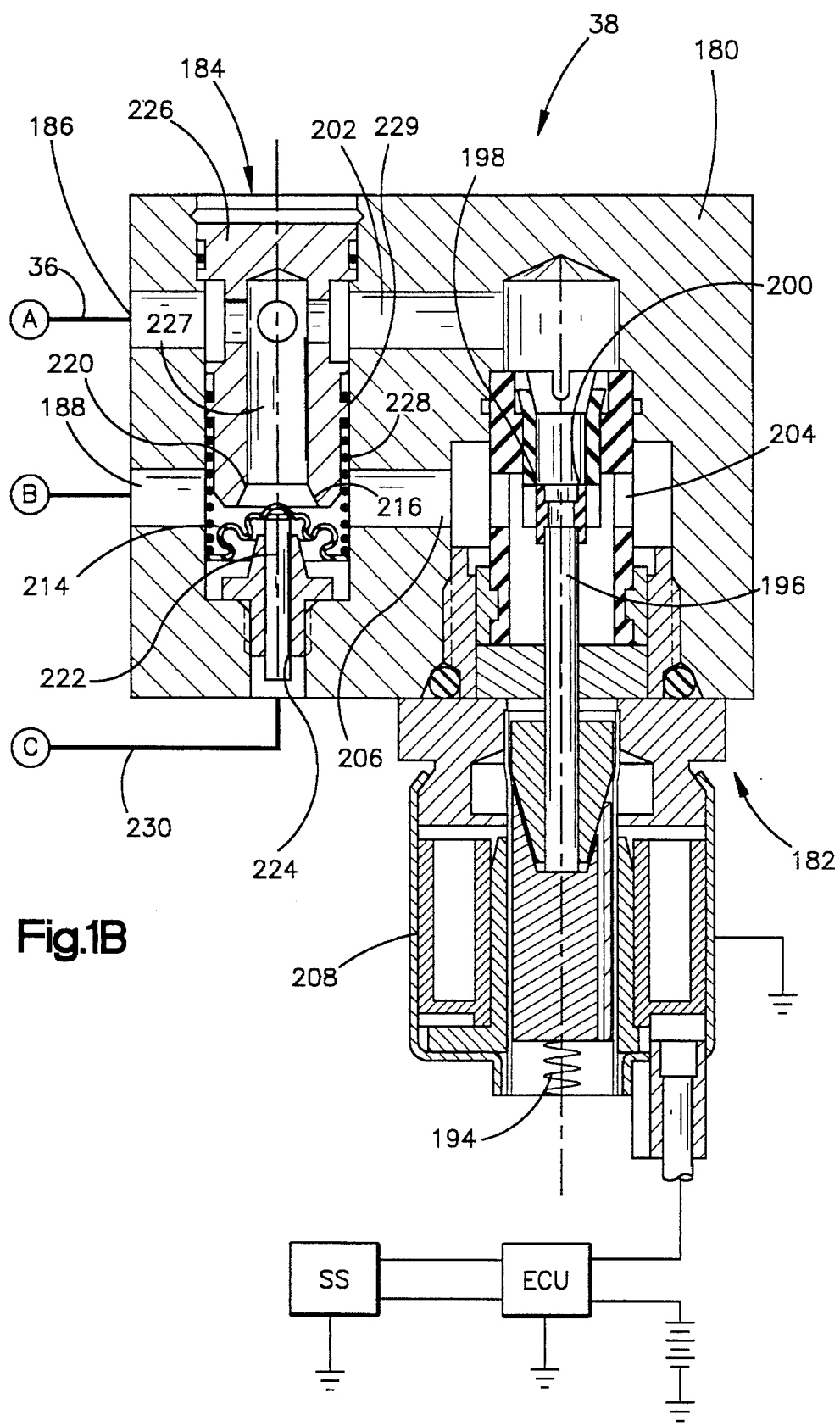
FIG. 1B is an enlarged sectional view of a speed responsive control unit forming another portion of the vehicle power steering system of FIG. 1A.

The points marked A, B and C in FIG. 1A correspond to the points marked A, B and C in FIG. 1B. Thus, return conduit 36 conducts fluid from the steering valve 22 to the speed responsive control unit 38. Return conduit 34 conducts fluid from the steering valve 22 and the speed responsive control unit 38 to the reservoir 32. Conduit 230 conducts fluid from the pump 24 to the speed responsive control unit 38 and will be described in detail hereinafter.

The control valve 22 (FIG. 1A) includes an inner rotary valve member 40 and an outer rotary valve member or sleeve 42. The outer valve member 42 encloses the inner valve member 40. The inner valve member 40 and outer valve member 42 are rotatable relative to (a) each other and (b) a housing 44 about a common central axis 46.

The inner valve member 40 is formed on a part of a cylindrical input member or valve stem 50 which is connected with the steering wheel 18. The outer valve member 42 is connected with a follow-up member 54 by a pin 56. The follow-up member 54 is rotatably supported in the housing 44 by bearings 58 and 60. The follow-up member 54 has a pinion gear portion 64 which is in meshing engagement with the toothed portion of a rack 66. The rack 66 is drivingly connected with the power steering motor 31 and steerable vehicle wheels as is well known in the art.

The inner valve member 40 and the outer valve member 42 are drivingly interconnected through a resilient torsion bar spring 51 (which is only partially visible in FIG. 1A), as is well known in the art, and a drive mechanism 55 defined by dogs 57 on an end of the follow-up member 54 and tines 59 on an end of the input member 50. The dogs 57 and the tines 59 allow limited rotational movement of the input member 50 relative to the follow-up member 54 when the torque in the pinion gear portion 64 required to displace the rack 66 exceeds the torque required to deflect the torsion bar 51. Hence, the input member 50 can be displaced by a few degrees relative to the follow-up member 54 with the displacement occurring in the torsion bar 51.

The outer valve member 42 is fixed against rotation relative to the follow-up member 54 by pin 56. Accordingly, the input member 50 and the inner valve member 40 can be rotated slightly with respect to the follow-up member 54 and the outer valve member 42. The amount of relative rotation, within the limits of the dog and tine drive mechanism 55, is proportional to the torque in the torsion bar 51 and other elements of the manual steering drive line, such as the follow-up member 54 and the input member 50. This relative rotation between the input member 50 and the outer valve member 42 is used to control the flow of hydraulic fluid from the pump 24 to the steering motor 31.

The pump 24 is a fixed positive displacement pump. The control valve 22 (FIG. 1A) is of the open-center type. Therefore, when the control valve 22 is in an initial or unactuated neutral condition, that is when there is no steering demand, fluid flow from the pump 24 is directed by the control valve 22 to the return conduits 34 and 36 and reservoir 32. Hence, fluid is circulated at low pressure, by the pump 24 through the valve 22 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, will be rotated about the axis 46 relative to the outer valve member 42. This relative rotation moves valving edges on the inner valve member 40 relative to valving edges on the sleeve 42, creates, in a known manner, a demand for higher pressure fluid from the pump 24 and directs the higher pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the flow area communicating the motor conduit 28 with the reservoir 32 and increase the flow area communicating the motor conduit 28 with the pump 24. The relative rotation between the inner valve member 40 and outer valve member 42 also increases the flow area communicating the motor conduit 30 with the reservoir and reduces the flow area communicating the motor conduit 30 with the pump 24. The result is higher pressure fluid generated by the pump 24 which is conducted to the motor cylinder chamber 72. This higher pressure fluid will move the piston 76 toward the right, as viewed in FIG. 1A. As the piston 76 moves toward the right, fluid is forced from the chamber 74 through the motor conduit 30, the control valve 22, the return conduits 34 and 36, and the speed responsive control unit 38 to the reservoir 32.

As the power steering motor 31 operates, the rack 66, which is also the rod for the motor 31, rotates the pinion 64 and follow-up member 54. This rotation of the follow-up member 54 together with the torque from the torsion bar 51 rotates the outer valve member 42 relative to the inner valve member 40 tending to return the valve 22 to its open center, neutral position. When the motor 31 is operated to turn the steerable vehicle wheels to an extent corresponding to the extent of rotation of the inner valve member 40, the feedback of the rotation of the follow-up member 54 caused by movement of the rack 66 rotates the pinion 64 through a distance sufficient to move the outer valve member 42 to its initial position relative to the inner valve member. When this occurs, the fluid pressure in the motor cylinder chambers 72 and 74 falls and equalizes and the motor 31 stops operating.

Pressurized fluid from the pump 24 is conducted to an annular central groove 80 formed in the outer valve member 42. Fluid flows to the inside of the valve member 42 through a pair of diametrically opposite passages 82 and 84. The inner and outer valve members 40 and 42 may have the same construction and cooperate with each other and the torsion bar 51 in the same manner as described in U.S. Pat. No. 4,276,812 issued Jul. 7, 1981 and entitled "Power Steering Valve and Method of Making Same". However, the inner and outer valve members 40 and 42 could have a different construction if desired.

The control valve 22 may be a "four land" type valve. The inner valve member 40 has a generally square cross-sectional configuration with rounded corners which form the four valving lands that cooperate with the edges of four axially extending grooves formed inside the outer valve member 42 to control the flow of fluid to and from the motor 31. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

One end of the torsion bar 51 is connected to the valve stem 50 and the opposite end of the torsion bar is connected to the follow-up member 54. The torsion bar 51 resiliently deflects when subjected to torque in a vehicle steering activity enabling relative rotation between the inner and outer valve members 40 and 42, and when free of torque, urges the inner and outer valve members 40 and 42 to their initial positions all as is well known in the art.

In accordance with the present invention, the torque required to actuate the control valve 22 increases as vehicle speed increases. At relatively low vehicle speeds, relative rotation of the inner and outer valve members 40 and 42 is controlled by the spring constant of the torsion bar 51 and a relatively small torque is required to rotate the inner valve member 40 relative to the outer valve member 42 and hence actuate the hydraulic assist motor 31 making the steering feel less manual. At higher vehicle speeds, the control unit 38 causes fluid pressure to act on a slidable, annular force transmitting member 116 drivingly connected to the input member 50, a cam assembly 120, and outer valve member 42 which cooperates with the torsion bar 51 to require a larger torque to rotate the inner valve member 40 relative to the outer valve member 42 making the steering feel more manual.

The force transmitting member or slider 116 (FIG. 1A) is disposed in the power steering control valve housing 44. The force transmitting member 116 rotates about its central axis 46 with the inner valve member 40 and the valve stem 50 and is movable axially along the valve stem 50.

The force transmitting member 116 is connected with the outer valve member 42 by a cam assembly 120. The cam assembly 120 includes a plurality of downwardly facing (as viewed in FIG. 1A) cam surfaces 122 on the force transmitting member 116, a plurality of upwardly facing (as viewed in FIG. 1A) cam surfaces 124 on the outer valve member 42, and a plurality of balls or spherical cam elements 126 located between the cam surfaces 122 and 124, preferably four of each. However, a greater or lesser number of cam elements 126 and cam surfaces 122 and 124 could be used if desired.

The force transmitting member 116 is urged axially toward the outer valve member 42 by a spring 130 acting between a collar 232 connected to the valve stem 50 and the slidable force transmitting member 116. The spring 130 may be a coil spring if desired. The force applied against the force transmitting member 116 by the spring 130 urges the cam surfaces 122 and 124 against opposite sides of the balls 126 and maintains and centers the balls on the cam surfaces 122 and 124.

Annular upper surface 142 and annular lower surface 144 of the force transmitting member 116 cooperate with a cylindrical inner side surface 134 of the housing 44 and the cylindrical outer surface 135 of the valve stem 50 to partially define a chamber 98 and an annular pressure chamber 136 on axially opposite sides of the force transmitting member 116. A pair of diametrically opposite openings 94 in the inner valve member 40 extend radially inward to an axially extending central passage in the inner valve member 40 in which (a) the torsion bar 51 is located and (b) is used to conduct hydraulic fluid to the chamber 136 through opening 138 extending radially outwardly from the axially extending central passage.

The pressure chamber 136 is connected to the reservoir 32 by the return conduits 36 and 34 and the speed responsive control unit 38. From the pressure chamber 136 the fluid is conducted to the speed responsive control unit 38 by the return conduit 36 and from the speed responsive control unit 38 to the reservoir 32 by the return conduit 34.

The force transmitting member 116 has a generally fluid tight fit with the inner side surface 134 of the housing 44. The chamber 98 is connected in fluid communication with the reservoir 32 by return conduit 34. Any fluid which leaks from the pressure chamber 136 into the chamber 98 is thus conducted back to the reservoir 32.

Although the preferred embodiment of the present invention is shown with the spring 130 located in chamber 136, the spring 130 may not be used. If there is no spring, the length of the steering control valve housing 44 can be reduced by reducing the axial length of the chamber 136.

Rotation of the valve stem 50 and inner valve member 40 relative to the housing 44 and outer valve member 42 is resisted by a force which is related to the spring constant of the torsion bar 51 and a combination of the axial force on the force transmitting member 116 by spring 130 and the fluid pressure force applied against the annular surface 142.

The balls 126 act as driving connections between the force transmitting member 116 and the outer valve member 42. Upon rotation of the inner valve member 40, the cam surfaces 122 and 124 in the force transmitting member 116 and outer valve member 42 create axial and tangential forces on the balls 126 with respect to the force transmitting member 116 and the outer valve member 42. These forces translate into (a) additional torque in the steering column felt by the operator of the vehicle, and (b) resistance to relative rotation of the inner and outer valve members 40 and 42.

Relative rotation between the inner valve member 40 and the outer valve member 42 causes the spherical elements 126 to tend to roll on the cam surfaces 122 and 124 and therefore to move the force transmitting member 116 axially away from an end 146 of the outer valve member 42. Obviously, the force required to move the force transmitting member 116 axially away from the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 and inner valve member 40 relative to the outer valve member 42.

The speed responsive control unit 38 (FIG. 1B) responds to steering activity and vehicle speed to control the fluid pressure in the chamber 136. The speed responsive control unit 38 is connected in fluid communication with the chamber 136 in the housing 44 by the return conduit 36.

The speed responsive control unit 38 includes a housing 180 which is connected hydraulically in series between the return conduit 36 and the return conduit 34. First and second control valves 182 and 184 in the housing 180 regulate the fluid pressure in the chamber 136 of the steering control valve 22. The valves 182 and 184 are connected hydraulically in parallel between the return conduits 36 and 34 for controlling the pressure in the chamber 136. The valve 182 is responsive to an electrical signal from an electronic control unit (ECU) which is indicative of the speed of the vehicle as measured by a speed sensor SS. The valve 184 is responsive to the fluid pressure of the pump 24 that is supplied to the steering valve 22.

The housing 180 (FIG. 1B) has an inlet 186 in fluid communication with valves 182 and 184 and the chamber 136 through return conduit 36. The housing 180 includes an outlet 188 in fluid communication with chamber 98, valves 182 and 184 and return conduit 34. Fluid from the chamber 136 flows through the return conduit 36 to the valve housing 180 and from the valve housing 180 to the return conduit 34 and to the reservoir 32.

The valve 182 is a solenoid operated normally closed valve and comprises a spring 194 which urges a poppet 196 against a seat 198. When the poppet 196 is spaced from the seat 198 (FIG. 2), the poppet 196 and seat 198 define an orifice 200 through which fluid from chamber 136 flows. The housing 180 (FIG. 1B) includes a passageway 202 that conducts fluid from the inlet 186 to the orifice 200. Openings 204 in the valve 182 conduct fluid that flows through the orifice 200 to a passageway 206 in the housing 180 for conducting the fluid around valve 184 to the outlet 188 and then to reservoir 32 through conduit 34.

A solenoid 208 of the valve 182 controls the position of the poppet 196 relative to the valve seat 198 as a function of the vehicle speed. The ECU can be programmed to provide a signal to solenoid 208 which positions the poppet 196 at different positions depending on vehicle speed. At engine idle and lower vehicle speeds, for example, less than 15 mph, the solenoid 208 is energized to move the poppet 196 (FIG. 2) against the bias of the spring 194 and fully open the orifice 200 and to allow fluid to flow freely from the chamber 136 to the reservoir 32. At relatively higher vehicle speeds, for example, above 35 mph, the solenoid 208 is deenergized allowing the spring 194 (FIG. 1B) to urge the poppet 196 against the valve seat 198 and restrict the orifice 200. At intermediate vehicle speeds, for example, between 15 mph and 35 mph, the solenoid 208 controls the size of the orifice 200 and hence fluid flow from a larger size orifice 200 at vehicle speeds near 15 mph to a smaller size orifice 200 at vehicle speeds near 35 mph to modulate the pressure in chamber 136.

Figure 2:
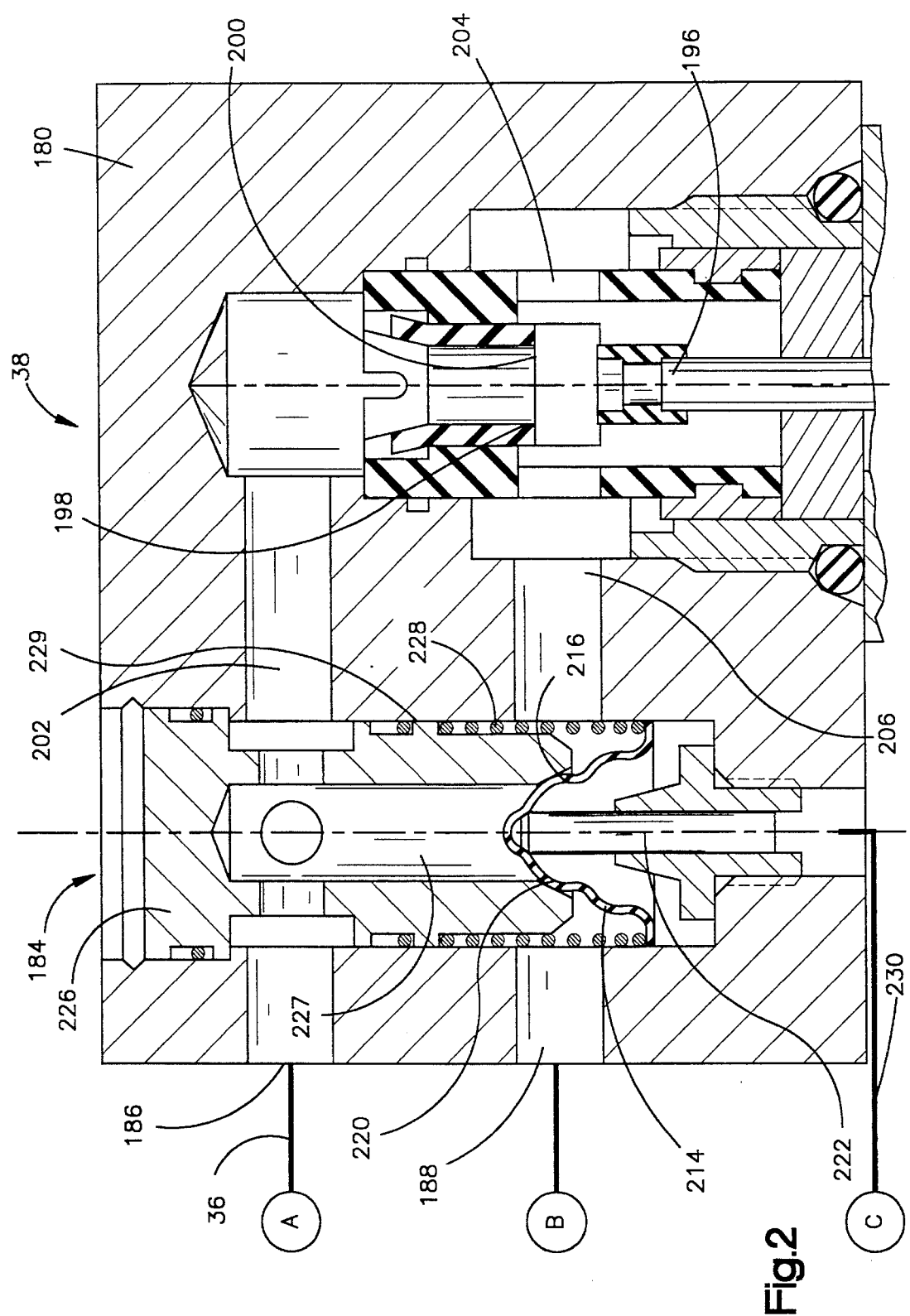
FIG. 2 is an enlarged portion of the speed responsive control unit of FIG. 1B showing positions of valves of the speed responsive control unit.

The valve 184 (FIG. 1B) is normally open and includes a restrictor valve 214 that is urged by pump pressure against a seat 216 (FIG. 2). When the restrictor valve 214 is open (FIG. 1B), spaced from the seat 216, the restrictor and seat define an orifice 220. A pin 222 axially movable in a bore 224 is exposed to pump pressure and engages the restrictor valve 214. Under some conditions of pump pressure, the pin 222 (FIG. 2) urges the valve 214 against the seat 216. An annular end of a plug 226 (FIG. 1B) in the housing 180 defines the valve seat 216. The plug 226 includes an axially extending passage 227 for conducting fluid from the inlet 186 to the orifice 220. The edge of the valve 214 is held against the housing 180 in any known manner, such as by a spring 228 disposed between an annular flange 229 of the plug 226 and the edge of the valve 214.

A conduit 230 conducts fluid pressure generated by the pump 24, in response to steering demand, from the pump 24 to apply fluid pressure on an axial end portion of the pin 222. The fluid pressure urges the pin 222 into engagement with the restrictor valve 214 and thus, valve 214 toward the valve seat 216. Fluid conducted from the pressure chamber 136 applies a force to the valve 214 in opposition to the force created by the fluid pressure acting on the pin 222. When the pin 222 moves axially relative to the bore 224, the valve 214 moves relative to the valve seat 216 to open and close the orifice 220.

The pin 222 has a cross-sectional area against which the fluid pressure in the conduit 230 is applied that is smaller than the area of the valve 214 against which the fluid pressure in the chamber 136 is applied. Therefore, the fluid pressure in the chamber 136 is proportional to the fluid pressure in the conduit 230. The orifice 220 will be relatively large, as seen in FIG. 1B, and the pressure in chamber 136 will be low when pressure in conduit 230 is low. When steering demand is increased, the fluid pressure in the conduit 230 increases causing the pin 222 to urge the valve 214 toward a closed position, as seen in FIG. 2. By changing the cross-sectional area of the pin 222 relative to the area of the valve 214 against which the fluid pressure in chamber 136 is applied, the effect that the steering demand has on the resistance to relative rotation between the valve stem 50 and the outer valve member 42 and therefore the onset and level of hydraulic assist to steering can be controlled, as will be apparent from the description below.

At engine idle and relatively low vehicle speeds, the solenoid 208 is energized, and when there is no steering taking place, there is relatively free flow of fluid from the pump 24 to reservoir 32 through various conduits as described above, and the pressure in conduit 230 is low. Therefore, the orifices 200 and 220 are open and allow fluid from the chamber 136 to flow freely to the reservoir 32. A relatively low fluid pressure is present in the return conduit 36 and in the chamber 136. At engine idle and low vehicle speeds, the force of the spring 130 and the low fluid pressure in chamber 136 urge the force transmitting member 116 toward the cam elements 126.

Upon rotation of the steering wheel 18 and valve stem 50 at engine idle and relatively low vehicle speeds, the pressure in conduit 230 increases and acts on pin 222 to close or restrict the orifice 220 depending on the steering demand. The orifice 200 remains open due to the relatively low vehicle speed. Since the orifices 200 and 220 are connected in parallel, the low pressure in chamber 136 is maintained. When there is steering activity, a torque is created between the valve stem 50 and the outer valve member 42, the cam elements 126 exert a force on the force transmitting member 116. The resultant force tends to move the force transmitting member 116 axially away from the outer valve member 42 against the force of the spring 130 and the low pressure in chamber 136. As this occurs, the spring 130 is compressed against the collar 232 of the valve stem 50.

During steering at relatively low speeds, the pump 24 conducts high pressure fluid through conduit 230 to apply a large pressure against pin 222 which creates a force and closes the orifice 220. However, the orifice 200 remains open and therefore the pressure in chamber 136 remains low (FIG. 2). Thus, there is little resistance to relative rotation between the valve stem 50 and outer valve member 42 and the steering effort feels less manual.

At relatively high speeds of the vehicle, the solenoid 208 is deenergized and the orifice 200 is closed or restricted. During a steering maneuver at relatively high speeds, the pump 24 conducts fluid through conduit 230 to apply fluid pressure against the pin 222 and close or restrict the orifice 220. Thus, the pressure in chamber 136 is at a maximum and there is maximum resistance to relative rotation of the valve stem 50 and outer valve member 42 and less hydraulic assist is provided and the steering feels more manual.

The maximum pressure in chamber 136 is limited by the bias of the spring 194. Pressure in chamber 136 can overcome the bias of the spring 194 and open the orifice 200 to limit the pressure in the chamber 136. Thus, by changing the biasing force of the spring 194, the maximum pressure in chamber 136 can be changed and therefore, the resistance to relative rotation between the inner and outer valve members 40 and 42 can be tailored to specific requirements.

At high vehicle speeds and no steering, a low pressure in conduit 230 acts on pin 222 and the orifice 220 is open (FIG. 1B). Therefore, fluid pressure is vented from the chamber 136 to the reservoir 32 preventing a fluid pressure build up in the chamber 136. The control valve 22 is in neutral allowing free circulation of fluid from the pump 24 to the chamber 136 and to the reservoir 32. Thus, there is a low steering torque and no horsepower loss or heat generated due to the pump acting against a relatively high pressure in chamber 136 even though vehicle speed is high and orifice 200 may be closed or substantially restricted.

Although the valve 182 has been described as varying the size of the orifice 200 from a larger size orifice to a smaller size orifice as vehicle speed increases, the valve 182 may be an on-off solenoid valve. When the vehicle speed is below a predetermined value, the solenoid 208 is energized to move the poppet 196 against the bias of the spring 194 and fully open the orifice 200 and vent the pressure from the chamber 136. When the vehicle speed exceeds the predetermined value the solenoid 208 is deenergized allowing the spring 194 to urge the poppet 196 against the valve seat 198 and close the orifice 200, and valve 182 acts like a relief valve.

In the embodiment of the invention illustrated in FIGS. 1A, 1B, and 2 the pressure in the fluid pressure chamber was varied in response to changes in vehicle speed and steering demand. In the embodiment of the invention illustrated in FIGS. 3A and 3B, the pressure in the fluid pressure chamber is only varied as a function of steering demand. Since the embodiment of the invention illustrated in FIGS. 1A, 1B and 2 is generally similar to the embodiment of the invention illustrated in FIGS. 3A and 3B, similar numerals will be utilized to designate similar components, the suffix letter "a" being added to the numerals of FIGS. 3A and 3B to avoid confusion.

In a second embodiment of the present invention, a vehicle power steering system 12a (FIG. 3A) is operable to turn steerable vehicle wheels (not shown) upon rotation of a steering wheel 18a by an operator of the vehicle. Rotation of the steering wheel 18a actuates a hydraulic power steering directional control valve 22a to port hydraulic fluid from an engine driven pump 24a and supply conduit 26a to either one of a pair of motor conduits 28a and 30a. The high pressure fluid conducted from the supply conduit 26a through one of the motor conduits 28a or 30a effects operation of a power steering motor 31a to turn the steerable vehicle wheels in one or another direction. Simultaneously, fluid is conducted from the motor 31a to a reservoir 32a through the other one of the motor conduits 28a or 30a, the control valve 22a, return conduits 34a and 36a, and a hydraulic pressure responsive valve 184a (FIG. 3B).

Figure 3A:
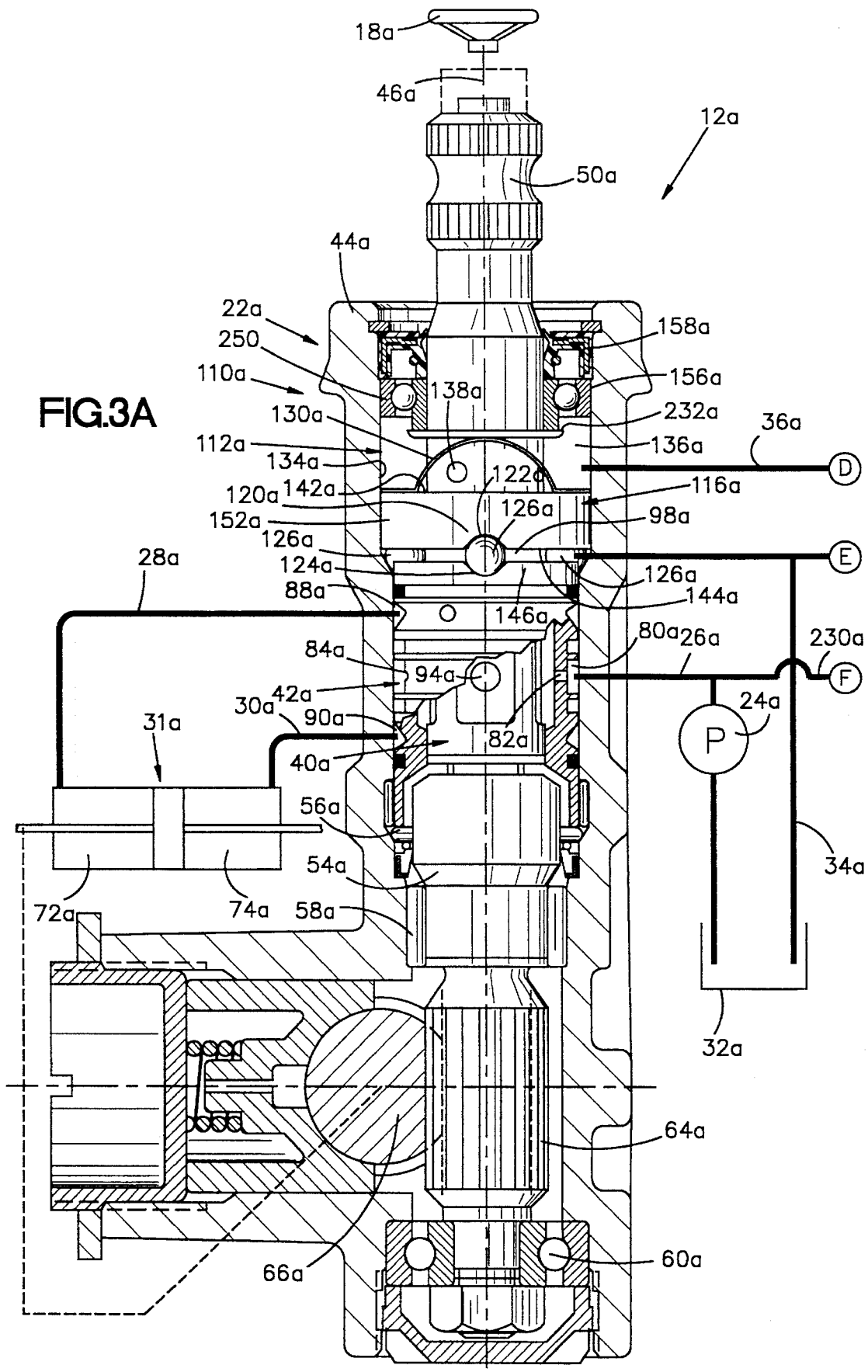
FIG. 3A is a schematic view of a portion of a second embodiment of a power steering system and includes a large sectional view of a power steering control valve.
Figure 3B:
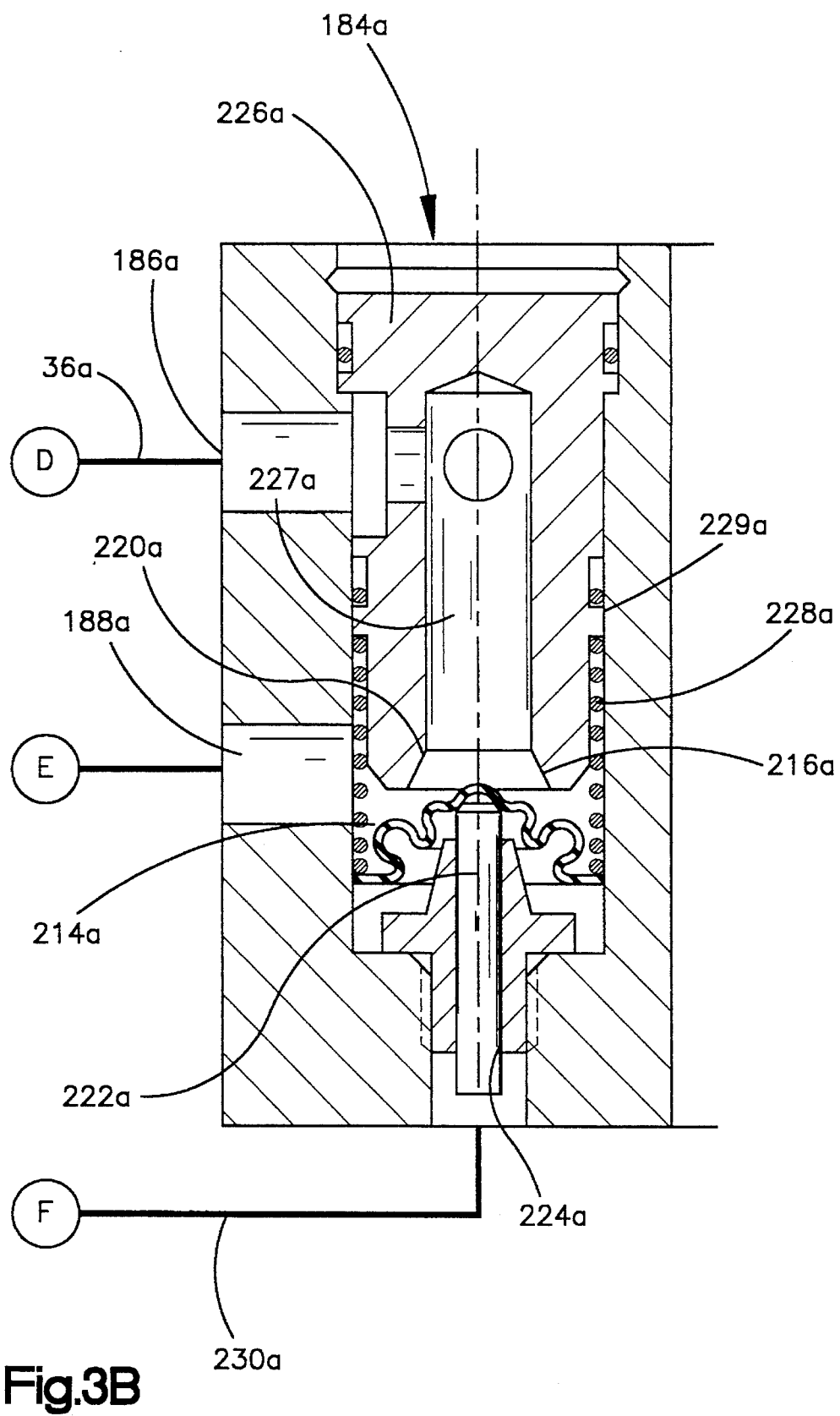
FIG. 3B is an enlarged sectional view of a hydraulic pressure responsive valve forming another portion of the vehicle power steering system of FIG. 3A.

The points marked D, E and F in FIG. 3A correspond to the points marked D, E and F in FIG. 3B. Thus, return conduit 36a conducts fluid from the steering valve 22a to the valve 184a. Return conduit 34a conducts fluid from the steering valve 22a and the valve 184a to the reservoir 32a. Conduit 230a conducts fluid from the pump 24a to the valve 184a and will be described in detail hereinafter.

The control valve 22a (FIG. 1A) includes an inner rotary valve member 40a and an outer rotary valve member or sleeve 42a. The outer valve member 42a encloses the inner valve member 40a. The inner valve member 40a and outer valve member 42a are rotatable relative to (a) each other and (b) a housing 44a about a common central axis 46a.

The inner valve member 40a is formed on a part of a cylindrical input member or valve stem 50a which is connected with the steering wheel 18a. Bearings 250 support the inner valve member 40a and the valve stem 50a for rotation relative to the housing 44a. The bearings 250 also maintain the axial position of the inner valve member 40a relative to the outer valve member 42a. There is no torsion bar interconnecting the inner and outer valve members 40a and 42a.

The outer valve member 42a is connected with a follow-up member 54a by a pin 56a. The follow-up member 54a is rotatably supported in the housing 44a by bearings 58a and 60a. The follow-up member 54a has a pinion gear portion 64a which is in meshing engagement with the toothed portion of a rack 66a. The rack 66a is drivingly connected with the power steering motor 31a and steerable vehicle wheels as is well known in the art.

The outer valve member 42a is fixed against rotation relative to the follow-up member 54a by pin 56a. Accordingly, the input member 50a and the inner valve member 40a can be rotated slightly with respect to the follow-up member 54a and the outer valve member 42a. This relative rotation between the input member 50a and the outer valve member 42a is used to control the flow of hydraulic fluid from the pump 24a to the steering motor 31a.

The pump 24a is a fixed positive displacement pump. The control valve 22a (FIG. 3A) is of the open-center type. Therefore, when the control valve 22a is in an initial or unactuated neutral condition, that is when there is no steering demand, fluid flow from the pump 24a is directed by the control valve 22a to the return conduits 34a and 36a and reservoir 32a. Hence, fluid is circulated at low pressure, by the pump 24a through the valve 22a and back to the reservoir 32a.

Upon rotation of the steering wheel 18a and rotation of the valve stem 50a, the inner valve member 40a, if there is sufficient resistance to displacement of the rack 66a caused by frictional engagement of the vehicle tires with the ground or road surface, will be rotated about the axis 46a relative to the outer valve member 42a. This relative rotation moves valving edges on the inner valve member 40a relative to valving edges on the sleeve 42a, creates, in a known manner, a demand for higher pressure fluid from the pump 24a and directs the higher pressure fluid from the pump 24a to one of the motor conduits 28a or 30a and directs fluid from the other motor conduit to the reservoir 32a.

As the power steering motor 31a operates, the rack 66a, which is also the rod for the motor 31a, rotates the pinion 64a and follow-up member 54a. This rotation of the follow-up member 54a and the outer valve member 42a relative to the inner valve member 40a tends to return the valve 22a to its open center, neutral position. When the motor 31a is operated to turn the steerable vehicle wheels to an extent corresponding to the extent of rotation of the inner valve member 40a, the feedback of the rotation of the follow-up member 54a caused by movement of the rack 66a rotates the pinion 64a through a distance sufficient to move the outer valve member 42a to its initial position relative to the inner valve member. When this occurs, the fluid pressure in motor cylinder chambers 72a and 74a falls and equalizes and the motor 31a stops operating.

Pressurized fluid from the pump 24a is conducted to an annular central groove 80a formed in the outer valve member 42a. Fluid flows to the inside of the valve member 42a through a pair of diametrically opposite passages 82a and 84a. The inner and outer valve members 40a and 42a may have the same construction and cooperate with each other in the same manner as described in relation to the embodiment of FIG. 1A. However, the inner and outer valve members 40a and 42a could have a different construction if desired.

The control valve 22a may be a "four land" type valve. The inner valve member 40a has a generally square cross-sectional configuration with rounded corners which form the four valving lands that cooperate with the edges of four axially extending grooves formed inside the outer valve member 42a to control the flow of fluid to and from the motor 31a. The ends of one pair of diametrically opposite grooves on the inside of the outer valve member 42a are connected in fluid communication with an annular outer groove 88a connected with the motor conduit 28a. A second pair of diametrically opposite and axially extending grooves on the inside of the outer valve member 42a are connected in fluid communication with an annular outer groove 90a formed in the outer valve member and connected with the motor conduit 30a.

In accordance with the present invention, the torque required to actuate the control valve 22a increases as the inner and outer valve members 40a and 42a rotate relative to each other. In response to relative rotation between the inner and outer valve members 40a and 42a, the valve 184a causes fluid pressure to act on a slidable, annular force transmitting member 116a drivingly connected to the input member 50a, a cam assembly 120a, and outer valve member 42a. The farther away from the neutral position that the inner and outer valve members 40a and 42a move the larger the torque required to rotate the inner valve member 40a relative to the outer valve member 42a is.

The force transmitting member or slider 116a (FIG. 3A) is disposed in the power steering control valve housing 44a. The force transmitting member 116a rotates about its central axis 46a with the inner valve member 40a and the valve stem 50a and is movable axially along the valve stem 50a.

The force transmitting member 116a is connected with the outer valve member 42a by a cam assembly 120a. The cam assembly 120a includes a plurality of downwardly facing (as viewed in FIG. 3A) cam surfaces 122a on the force transmitting member 116a, a plurality of upwardly facing (as viewed in FIG. 3A) cam surfaces 124a on the outer valve member 42a, and a plurality of balls or spherical cam elements 126a located between the cam surfaces 122a and 124a, preferably four of each. However, a greater or lesser number of cam elements 126a and cam surfaces 122a and 124a could be used if desired.

The force transmitting member 116a is urged axially toward the outer valve member 42a by a spring 130a acting between a collar 232a connected to the valve stem 50a and the slidable force transmitting member 116a. The spring 130a may be a coil spring if desired. The force applied against the force transmitting member 116a by the spring 130a urges the cam surfaces 122a and 124a against opposite sides of the balls 126a and maintains and centers the balls on the cam surfaces 122a and 124a.

Annular upper surface 142a and annular lower surface 144a of the force transmitting member 116a cooperate with a cylindrical inner side surface 134a of the housing 44a and the cylindrical outer surface 135a of the valve stem 50a to partially define a chamber 98a and an annular pressure chamber 136a on axially opposite sides of the force transmitting member 116a. A pair of diametrically opposite openings 94a in the inner valve member 40a extend radially inward to an axially extending central passage in the inner valve member 40a which is used to conduct hydraulic fluid to the chamber 136a through opening 138a extending radially outwardly from the axially extending central passage.

The pressure chamber 136a is connected to the reservoir 32a by the return conduits 36a and 34a and the valve 184a. From the pressure chamber 136a the fluid is conducted to the valve 184a by the return conduit 36a and from the valve 184a to the reservoir 32a by the return conduit 34a.

The force transmitting member 116a has a generally fluid tight fit with the inner side surface 134a of the housing 44a. The chamber 98a is connected in fluid communication with the reservoir 32a by return conduit 34a. Any fluid which leaks from the pressure chamber 136a into the chamber 98a is thus conducted back to the reservoir 32a.

Although the preferred embodiment of the present invention is shown with the spring 130a located in chamber 136a, the spring 130a may not be used. If there is no spring, the length of the steering control valve housing 44a can be reduced by reducing the axial length of the chamber 136a.

Rotation of the valve stem 50a and inner valve member 40a relative to the housing 44a and outer valve member 42a is resisted by a force which is related to the axial force on the force transmitting member 116a by spring 130a and the fluid pressure force applied against the annular surface 142a.

The balls 126a act as driving connections between the force transmitting member 116a and the outer valve member 42a. Upon rotation of the inner valve member 40a, the cam surfaces 122a and 124a in the force transmitting member 116a and outer valve member 42a create axial and tangential forces on the balls 126a with respect to the force transmitting member 116a and the outer valve member 42a. These forces translate into (a) additional torque in the steering column felt by the operator of the vehicle, and (b) resistance to relative rotation of the inner and outer valve members 40a and 42a.

Relative rotation between the inner valve member 40a and the outer valve member 42a causes the spherical elements 126a to tend to roll on the cam surfaces 122a and 124a and therefore to move the force transmitting member 116a axially away from an end 146a of the outer valve member 42a. Obviously, the force required to move the force transmitting member 116a axially away from the outer valve member 42a varies as a function of the net force urging the force transmitting member 116a toward the outer valve member 42a. Thus, the greater the net force pressing the force transmitting member 116a against the balls 126a, the greater is the force required to rotate the valve stem 50a and inner valve member 40a relative to the outer valve member 42a.

The valve 184a includes a housing 180a which is connected hydraulically in series between the return conduit 36a and the return conduit 34a. The valve 184a in the housing 180a regulates the fluid pressure in the chamber 136a of the steering control valve 22a. The valve 184a is responsive to the fluid pressure of the pump 24a that is supplied to the steering valve 22a.

The housing 180a (FIG. 3B) has an inlet 186a in fluid communication with valve 184a and the chamber 136a through return conduit 36a. The housing 180a includes an outlet 188a in fluid communication with chamber 98a, valve 184a and return conduit 34a. Fluid from the chamber 136a flows through the return conduit 36a to the valve housing 180a and from the valve housing 180a to the return conduit 34a and to the reservoir 32a.

The valve 184a includes a valve body 214a and a valve seat 216a. When the valve body 214a is open, spaced from the seat 216a, the valve body and seat define an orifice 220a. The valve body 214a includes a main body portion 260, an insert 262 in the valve body, and a pin 222a fixedly connected to the valve body. The pin 222a is received in a bore 224a in the housing 180a and is exposed to pump pressure. An annular end of a plug 226a in the housing 180a defines the valve seat 216a. The plug 226a includes an axially extending passage 227a for conducting fluid from the inlet 186a to the orifice 220a.

A spring 264, schematically illustrated in FIG. 3B, located in a bore 266 in the main body portion 260 of the valve body 214a urges a ball 268 against the insert 262 to block an axial bore 270 in the insert. The spring 264 has an end engaging the pin 222a and the other end engaging the ball 268. The insert 262, ball 268, and spring 264 act as a relief valve to limit the maximum pressure in the chamber 136a. The main body portion 260 of the valve body 214a has radially extending openings 272 for conducting fluid from the bore 266 to the outlet 188a and to reservoir 32a.

A conduit 230a conducts fluid pressure generated by the pump 24a, in response to steering demand, from the pump 24a to apply fluid pressure on an axial end portion of the pin 222a. The fluid pressure urges the pin 222a and the valve 214a toward the valve seat 216a. Fluid conducted from the pressure chamber 136a applies a force to the valve body 214a in opposition to the force created by the fluid pressure acting on the pin 222a. When the pin 222a moves axially relative to the bore 224a, the valve 214a moves relative to the valve seat 216a to open and close the orifice 220a.

The pin 222a has a cross-sectional area against which the fluid pressure in the conduit 230a is applied that is smaller than the area of the valve 214a against which the fluid pressure in the chamber 136a is applied. Therefore, the fluid pressure in the chamber 136a is proportional to the fluid pressure in the conduit 230a. The orifice 220a will be relatively large and the pressure in chamber 136a will be low when pressure in conduit 230a is low. When steering demand is increased, the fluid pressure in the conduit 230a increases causing the pin 222a to urge the valve 214a toward a closed position. By changing the cross-sectional area of the pin 222a relative to the area of the valve 214a against which the fluid pressure in chamber 136a is applied, the effect that the steering demand has on the resistance to relative rotation between the valve stem 50a and the outer valve member 42a and therefore the onset and level of hydraulic assist to steering can be controlled, as will be apparent from the description below.

Upon rotation of the steering wheel 18a and valve stem 50a, the pressure in conduit 230a increases and acts on pin 222a to close or restrict the orifice 220a depending on the steering demand. A torque is created between the valve stem 50a and the outer valve member 42a, the cam elements 126a exert a force on the force transmitting member 116a. The resultant force tends to move the force transmitting member 116a axially away from the outer valve member 42a against the force of the spring 130a and the pressure in chamber 136a. As this occurs, the spring 130a is compressed against the collar 232a of the valve stem 50a.

The more that the inner valve member 40a rotates relative to the outer valve member 42a, the higher the pressure is in the conduit 230a. Thus, the more difficult it is for an operator of the vehicle to rotate the inner valve member 40a relative to the outer valve member 42a.

Although the first embodiment of the invention shown in FIG. 1A includes a torsion bar 51, the torsion bar does not need to be included. Bearings, similar to bearings 250 of the second embodiment as seen in FIG. 3A, may be used to axially position the inner valve member 40 relative to the outer valve member 42 of FIG. 1A.

It should be apparent to those skilled in the art that certain modifications, changes and adaptations may be made in the present invention and that it is intended to cover such modifications, changes and adaptations coming within the scope of appended claims.

Having described the inventions the following is claimed:

1. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member, said first and second valve members including means for conducting fluid to said fluid pressure chamber;

means for increasing the fluid pressure in said fluid pressure chamber in response to relative movement between said first and second valve members and as vehicle speed increases; and means for preventing an increase in the pressure in said fluid pressure chamber when the vehicle speed is below a predetermined value.

2. An apparatus as set forth in claim 1 wherein said preventing means includes means for venting the fluid pressure in said fluid pressure chamber when the vehicle speed is below the predetermined value.

3. An apparatus as set forth in claim 1 further including spring means located in said fluid pressure chamber for urging said force transmitting member toward said second valve member.

4. An apparatus as set forth in claim 1 wherein only the force applied by said force transmitting member resists relative movement between said first and second valve members.

5. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member, said first and second valve members including means for conducting fluid to said fluid pressure chamber;

means for increasing the fluid pressure in said fluid pressure chamber in response to relative movement between said first and second valve members and as vehicle speed increases;

means for preventing an increase in the pressure in said fluid pressure chamber when the vehicle speed is below a predetermined value, said preventing means including means for venting the fluid pressure in said fluid pressure chamber when the vehicle speed is below the predetermined value; and conduit means conducting fluid from said fluid pressure chamber to reservoir, said means for increasing the pressure in said fluid pressure chamber including a valve which responds to relative movement between the first and second valve members and is located in said conduit means.

6. An apparatus as set forth in claim 5 wherein said means for venting comprises a solenoid valve in parallel with said valve, said solenoid valve responding to vehicle speed.

7. An apparatus as set forth in claim 6 wherein said solenoid valve has a first position in which the fluid pressure in said fluid pressure chamber is vented and a second position in which the fluid pressure in said fluid pressure chamber increases in response to relative movement between the first and second valve members, said solenoid valve being in its first, position when the vehicle speed is below the predetermined valve and being in its second position when the vehicle speed exceeds the predetermined value.

8. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member, said first and second valve members including means for conducting fluid to said fluid pressure chamber;

means for increasing the fluid pressure in said fluid pressure chamber in response to relative movement between said first and second valve members and as vehicle speed increases, said means for increasing the fluid pressure in said fluid pressure chamber comprising a first orifice that is moved toward a closed position in response to relative movement between said first and second valve members; and means for preventing an increase in the pressure in said fluid pressure chamber when the vehicle speed is below a predetermined value.

9. An apparatus as set forth in claim 8 wherein said preventing means comprises a second orifice in parallel with said first orifice that is open to reservoir when the vehicle speed is below the predetermined value.

10. An apparatus as set forth in claim 9 wherein said second orifice is closed when the vehicle speed exceeds the predetermined value.

11. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first valve for increasing the pressure in said fluid pressure chamber as a function of relative movement between said first and second valve members to increase the resistance to relative movement between said first and second valve members with an increase in steering demand; and a second valve for venting said chamber when the vehicle speed is below a predetermined value to prevent an increase in resistance to relative movement between said first and second valve members with an increase in steering demands, said second valve being connected in parallel with said first valve.

12. An apparatus as set forth in claim 11 wherein said second valve includes a solenoid operated valve for increasing the fluid pressure in said fluid pressure chamber with an increase in vehicle speed.

13. An apparatus as set forth in claim 11 further including a source of fluid associated with said first and second valve members and wherein said first valve has a first position in which fluid is conducted from said fluid pressure chamber through said first valve and to reservoir and a second position in which fluid is blocked from flowing through said first valve, said first valve being urged to said second position by fluid pressure from said source of fluid.

14. An apparatus as set forth in claim 11 wherein only the force applied by said force transmitting member resists relative movement between said first and second valve members.

15. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first valve for increasing the pressure in said fluid pressure chamber as a function of relative movement between said first and second valve members to increase the resistance to relative movement between said first and second valve members with an increase in steering demand; and a second valve for venting said chamber when the vehicle speed is below a predetermined value to prevent an increase in resistance to relative movement between said first and second valve members with an increase in steering demand, said second valve including a solenoid operated valve for increasing the fluid pressure in said fluid pressure chamber with an increase in vehicle speed, said solenoid operated valve having a first position in which the fluid pressure in said fluid pressure chamber is vented and a second position in which the fluid pressure in said fluid pressure chamber increases as a function of relative movement between said first and second valve members, said solenoid operated valve being in its first position when the vehicle speed is below the predetermined value and being in its second position when the vehicle speed exceeds the predetermined value.

16. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first valve for increasing the pressure in said fluid pressure chamber as a function of relative movement between said first and second valve members to increase the resistance to relative movement between said first and second valve members with an increase in steering demand;

a second valve for venting said chamber when the vehicle speed is below a predetermined value to prevent an increase in resistance to relative movement between said first and second valve members with an increase in steering demand; and a source of fluid associated with said first and second valve members;

said first valve having a first position in which fluid is conducted from said fluid pressure chamber through said first valve and to reservoir and a second position in which fluid is blocked from flowing through said first valve, said first valve being urged to said second position by fluid pressure from said source of fluid, said first valve comprising an orifice defined by a seat and a restrictor valve, said restrictor valve being urged away from said seat by the fluid pressure in said fluid pressure chamber, and a pin engaging said restrictor valve for moving said restrictor valve toward said seat, said pin being urged into engagement with said restrictor valve by fluid pressure from said source of fluid.

17. An apparatus as set forth in claim 16 wherein the fluid pressure from said source of fluid is applied to a surface area of said pin, the fluid pressure in said fluid chamber is applied to a surface area of said restrictor valve, said surface area of said pin being smaller than said surface area of said restrictor valve.

18. An apparatus as set forth in claim 16 wherein said first and second valves are connected in parallel.

19. An apparatus as set forth in claim 18 further including a housing for said first and second valves, said housing having an inlet in fluid communication with said first and second valves and an outlet in fluid communication with said reservoir.

20. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first valve for increasing the pressure in said fluid pressure chamber as a function of relative movement between said first and second valve members to increase the resistance to relative movement between said first and second valve members with an increase in steering demand;

a second valve for venting said chamber when the vehicle speed is below a predetermined value to prevent an increase in resistance to relative movement between said first and second valve members with an increase in steering demand;

first conduit means for conducting fluid from a source of fluid to said first and second valve members;

second conduit means for conducting fluid between said first and second valve members and the vehicle power steering motor; and third conduit means for conducting fluid from said first and second valve members to reservoir, said first and second valves controlling the pressure in at least a portion of said third conduit means.

21. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member; and a first orifice for conducting fluid from the fluid pressure chamber that is moved toward a closed position in response to relative movement between said first and second valve members to increase the fluid pressure in said fluid pressure chamber in response to relative movement between said first and second valve members, said first orifice being urged toward an open position by the fluid pressure in said fluid pressure chamber.

22. An apparatus as set forth in claim 21 wherein said orifice is defined by a seat and a valve body.

23. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first orifice for conducting fluid from the fluid pressure chamber that is moved toward a closed position in response to relative movement between said first and second valve members to increase the fluid pressure in said fluid pressure chamber in response to relative movement between said first and second valve members, said first orifice being urged toward an open position by the fluid pressure in said fluid pressure chamber, said first orifice being defined by a seat and a valve body;

a pin engaging said valve body for moving said valve body toward said seat; and a source of fluid associated with said first and second valve members, said pin and said valve body being urged toward said seat by fluid pressure from said source of fluid, said valve body being urged away from said seat by the fluid pressure in said fluid pressure chamber.

24. An apparatus as set forth in claim 23 wherein the fluid pressure from said source of fluid is applied to a surface area of said pin, the fluid pressure in said fluid pressure chamber is applied to a surface area of said valve body, said surface area of said pin being smaller than the surface area of said valve body.

25. An apparatus comprising:

first and second valve members which are movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a first orifice for conducting fluid from the fluid pressure chamber that is moved toward a closed position in response to relative movement between said first and second valve members to increase the fluid pressure in said fluid pressure chamber in response to relative movement between said first and second valve members, said first orifice being urged toward an open position by the fluid pressure in said fluid pressure chamber; and a second orifice for venting said fluid pressure chamber when the speed of the vehicle is below a predetermined value to prevent an increase in resistance to relative movement between said first and second valve members with an increase in steering demand.

26. An apparatus as set forth in claim 25 wherein said second orifice is in parallel with said first orifice.

27. An apparatus as set forth in claim 25 wherein said second orifice is in an open position when the vehicle speed is below a predetermined value and in a closed position when the vehicle speed exceeds the predetermined value.

28. An apparatus as set forth in claim 25 wherein said second orifice is defined by a seat and a poppet, said poppet being moved toward said seat as vehicle speed increases.

* * * * *